(12) United States Patent
Shinano et al.

(10) Patent No.: US 8,410,188 B2
(45) Date of Patent: Apr. 2, 2013

(54) SEALANT FOR ONE-DROP FILL PROCESS

(75) Inventors: Hirokatsu Shinano, Tokyo (JP); Hiroya Fukunaga, Tokyo (JP); Kazuyuki Itano, Tokyo (JP)

(73) Assignee: Adeka Corporation, Tokyo (JP)

( * ) Notice: Subject to any disclaimer, the term of this patent is extended or adjusted under 35 U.S.C. 154(b) by 210 days.

(21) Appl. No.: 13/001,243

(22) PCT Filed: Jun. 24, 2010

(86) PCT No.: PCT/JP2010/060729
§ 371 (c)(1),
(2), (4) Date: Dec. 23, 2010

(87) PCT Pub. No.: WO2011/007649
PCT Pub. Date: Jan. 20, 2011

(65) Prior Publication Data
US 2011/0218267 A1    Sep. 8, 2011

(30) Foreign Application Priority Data

Jul. 13, 2009 (JP) ................. 2009-164561

(51) Int. Cl.
*G03F 7/029* (2006.01)
*C07D 303/40* (2006.01)
*C08F 20/22* (2006.01)
*C09K 19/00* (2006.01)

(52) U.S. Cl. .......... 522/66; 522/170; 522/182; 428/1.5; 428/1.53; 428/1.54; 428/1.55

(58) Field of Classification Search ............ 522/66, 522/170, 182; 428/1.5, 1.53, 1.54, 1.55
See application file for complete search history.

(56) References Cited

U.S. PATENT DOCUMENTS

| | | | | |
|---|---|---|---|---|
| 6,617,399 B2 * | 9/2003 | Konarski | ...... | 525/523 |
| 6,913,798 B2 * | 7/2005 | Kitamura et al. | ...... | 428/1.53 |
| 7,521,100 B2 * | 4/2009 | Imaizumi et al. | ...... | 428/1.53 |
| 7,898,634 B2 * | 3/2011 | Huang et al. | ...... | 349/153 |
| 2007/0096056 A1 * | 5/2007 | Takeuchi et al. | ...... | 252/299.01 |

FOREIGN PATENT DOCUMENTS

| | | |
|---|---|---|
| JP | 5-295087 | 11/1993 |
| JP | 2002-131902 | 5/2002 |
| JP | 2002-148633 | 5/2002 |
| JP | 2002-148643 | 5/2002 |
| JP | 2004-177737 | 6/2004 |
| JP | 2005-179564 | 7/2005 |
| JP | 2005-292801 | 10/2005 |
| JP | 2006-317520 | 11/2006 |
| JP | 2007-003911 | 1/2007 |
| JP | 2007-092037 | 4/2007 |
| JP | 2008-070624 | 3/2008 |

OTHER PUBLICATIONS

International Search Report, PCT/JP2010/060729, Aug. 3, 2010.

\* cited by examiner

*Primary Examiner* — Ling Choi
*Assistant Examiner* — Jessica E Whiteley
(74) *Attorney, Agent, or Firm* — Young & Thompson

(57) ABSTRACT

A sealant for a one drop fill process is characterized by curing through two steps consisting of photocure using visible light from which 400 nm or shorter wavelengths are cut off and thermal cure and, when in contact with a liquid crystal composition, is less contaminating to the liquid crystal composition with a photo radical initiator, and exhibits high adhesive strength to a substrate. The sealant contains (1) a titanocene photo radical initiator, (2) a photocuring resin, (3) a latent epoxy curing agent and, if necessary, (4) a monomer having at least two glycidyl ether groups per molecule as a thermosetting resin.

17 Claims, No Drawings

SEALANT FOR ONE-DROP FILL PROCESS

TECHNICAL FIELD

This invention relates to a sealant used in a one-drop fill (hereinafter abbreviated as ODF) process and a liquid crystal display device (hereinafter abbreviated as LCD) using the sealant. More particularly, it relates to a sealant for ODF used to seal a polymerizable liquid crystal composition and an LCD using the same.

BACKGROUND ART

ODF for LCD production has been replacing conventional vacuum-capillary filling for the purpose of process time saving. ODF technology includes the steps of applying a sealant to a first electroded substrate to a pattern of a display frame using a dispenser, dropping liquid crystals inside the frame, attaching a second electroded substrate to the first substrate in vacuo, temporarily curing the sealant by UV irradiation, and heating the liquid crystals and the sealant to anneal the liquid crystals and to complete curing the sealant. According to the ODF process, curing the sealant in two stages, i.e., photocure and thermal cure, allows reduction of curing time, which leads to shortening the process time for the LCD manufacturing.

However, because the currently practiced conditions for sealant curing including UV irradiation and high temperature heating cause considerable damage to the liquid crystals treated concurrently, the demands, such as retention of electro-optical characteristics of liquid crystals, are not fulfilled. Additionally, there are demands for energy saving in thermal cure and further reduction of process time.

There is another problem with a conventional sealant. That is, when an uncured sealant comes into contact with a liquid crystal composition containing a compound having a carbon-carbon double bond, such as a liquid crystal compound and/or a polymerizable compound each having an alkenyl group, a (meth)acryl group, an allyl group, a maleimide group, etc. on its side chain, a photo radical initiator is eluted from the sealant into the liquid crystal composition. The eluted photo radical initiator can accelerate photo deterioration or induce unnecessary polymerization thereby to impair the reliability of the LCD.

Accordingly, a sealant from which a photo radical initiator is less elutable into a liquid crystal composition has been sought for.

As used herein, the term "polymerizable liquid crystal composition" denotes a liquid crystal composition containing a liquid crystal compound and/or a polymerizable compound each having a polymerizable functional group. Specifically, the term means a liquid crystal composition containing a liquid crystal compound and/or a polymerizable compound each having a carbon-carbon unsaturated double bond, at which two or more molecules thereof are capable of forming a covalent bond on reaction with a radical. More specifically, the term means a liquid crystal composition containing a liquid crystal compound and/or a polymerizable compound each having at least one of alkenyl, styryl, allyl, vinyloxy, (meth)acryl, maleimide, and so on bonded thereto conjugatedly or nonconjugatedly. The term "(meth)acryl" as used herein refers to acryl or methacryl.

Liquid crystal compounds having an alkenyl group having a small rotational viscosity coefficient are often used in TN, VA, IPS, or other mode nematic liquid crystal materials for TFT-LCDs for the purpose of raising response speed to address moving images and the like. As stated, however, when an uncured sealant contacts the liquid crystal material, a photo radical initiator is eluted from the sealant into the liquid crystal material to induce photo deterioration of the alkenyl group.

A display having liquid crystal alignment controlled by using a polymerizable liquid crystal composition is called a polymer stabilized liquid crystal display. A polymer stabilized liquid crystal display is produced by the steps of providing a liquid crystal cell containing a polymerizable liquid crystal composition in its uncured state and then photocuring the monomer in a desired alignment state with a voltage applied, whereby the alignment of the liquid crystals in the cell is controlled by the polymer network to achieve an increased response speed and a widened viewing angle. When a polymer stabilized liquid crystal display device is produced using a photocuring polymerizable liquid crystal composition by an ODF process, the steps for the production are as follows.

A sealant is patternwise applied to a substrate by means of, for example, a dispenser. A polymerizable liquid crystal composition is dropped on a substrate. Another substrate is attached thereto. Only the sealant is photocured by irradiation with visible light and then thermally cured. Thereafter, the polymerizable liquid crystal composition is UV cured. Since two photocuring steps are required as described, the cure selectivity between the sealant and the polymerizable liquid crystal composition is an important factor that influences the optical performance of the prepared device.

Patent document 1 (see below) discloses a combination of a high-molecular photo initiator having three or more aromatic rings and a resin composition containing 60 mol % or more of a photocuring functional group. The combination disclosed does not aim at curing making use of visible light.

Conventionally used latent epoxy curing agents include hydrazide curing agents and amine-adduct curing agents. A hydrazide curing agent, being a single compound, can be made less contaminating to liquid crystals by removing impurities through purification. However, curing with a hydrazide curing agent needs heating at 120° C. for about one hour, so that a curing agent which reacts at a lower temperature in a shorter time has been awaited. Of amine adduct curing agents those having a tertiary amino group are liable to form an amine salt to interfere with polymerization, which can result in a failure to obtain a cured resin with satisfactory physical properties. Those having a primary amino group tend to react with an epoxy resin and therefore have the disadvantage of short pot life. Patent document 2 (see below) proposes a solution to this problem by masking the primary amino group with an acidic substance and discloses a latent epoxy curing agent that enables cure at 80 to 100° C. However, the document neither describes nor suggests combining the curing agent with a photocuring resin for use as a sealant for ODF.

Citation List
Patent Document
Patent document 1: JP 2007-3911A
Patent document 2: JP 2005-292801A

SUMMARY OF THE INVENTION

Problem to be Solved by the Invention

An object of the invention is to provide a sealant for an ODF process which is characterized by curing through two-steps consisting of photocure using visible light from which 400 nm or shorter wavelengths are cut off and thermal cure, involves, upon contact with a liquid crystal composition, less contamination to the liquid crystal composition with a photo radical initiator, and exhibits high adhesive strength to a substrate.

Means for Solving the Problem

The above object of the invention is accomplished by the provision of a sealant for an ODF process having, as active components, a specific photo radical initiator, a photocuring resin, and a latent epoxy curing agent.

The invention provides a sealant for an ODF process containing a titanocene photo radical initiator (1), a photocuring resin (2), a latent epoxy curing agent (3) and, if necessary, a monomer having at least two glycidyl ether groups per molecule (4) as a thermosetting resin.

In the cases when the sealant does not contain the monomer having at least two glycidyl ether groups per molecule (4), the photocuring resin (2) must have thermosetting properties.

The invention also provides an LCD produced by using the sealant for an ODF process.

The invention also provides a photosensitive resin composition containing a titanocene photo radical initiator that generates a radical on exposure to light having wavelengths longer than 400 nm (1'), a monomer and/or an oligomer each having at least two (meth)acryl groups per molecule (2'), a reaction product obtained by the reaction between a polyamine having at least one active hydrogen atom and at least two nitrogen atoms per molecule and an acidic compound (3'), and a monomer having at least two glycidyl ether groups per molecule (4).

EFFECT OF THE INVENTION

The sealant for ODF according to the invention is characterized by achieving two-step cure consisting of photocure using visible light from which 400 nm or shorter wavelengths are cut off and thermal cure. It contains a titanocene photo radical initiator as a photo initiator that uses visible light, a photocuring resins, a latent epoxy curing agent and, if necessary, a monomer having at least two glycidyl ether groups per molecule as a thermosetting resin. Therefore, the sealant is less contaminating to the liquid crystal composition, superior in seal strength, and suitable for use in polymer stabilized LCDs.

BEST MODE FOR CARRYING OUT THE INVENTION

The present invention will be described in detail with reference to its preferred embodiments.

The sealant for ODF of the invention contains a titanocene photo radical initiator (1), a photocuring resin (2), a latent epoxy curing agent (3) and, if necessary, a monomer having at least two glycidyl ether groups per molecule (4) as a thermosetting resin. The components (1) to (4) will be described sequentially.

<Titanocene Photo Radical Initiator (1)>

Any compound having a titanocene structure may be used as a titanocene photo radical initiator (1) in the invention. It can be chosen from various titanocene compounds described, for example, in JP 59-152396A (EP 0122223 B1), JP 61-151197A (EP 0186626 B1), and JP 2-291A (EP 0318894 B1). Examples of preferred compounds are bis(cyclopentadienyl)-Ti-dichloride, bis(cyclopentadienyl)-Ti-bisphenyl, bis(cyclopentadienyl)-Ti-bis-2,3,4,5,6-pentafluorophenyl, bis(cyclopentadienyl)-Ti-bis-2,3,5,6-tetrafluorophenyl, bis(cyclopentadienyl)-Ti-bis-2,4,6-trifluorophenyl, bis(cyclopentadienyl)-Ti-bis-2,6-difluorophenyl, bis(cyclopentadienyl)-Ti-bis-2,4-difluorophenyl, bis(methylcyclopentadienyl)-Ti-bis-2,3,4,5,6-pentafluorophenyl, bis(methylcyclopentadienyl)-Ti-bis-2,3,5,6-tetrafluorophenyl, bis(methylcyclopentadienyl)-Ti-bis-2,6-difluorophenyl, bis(cyclopentadienyl)-bis(2,6-difluoro-3-(pyry-1-yl)phenyl)titanium, bis(cyclopentadienyl)-bis(2,4,6-trifluoro-3-(pyry-1-yl)phenyl)titanium, and bis(cyclopentadienyl)-bis(2,4,6-trifluoro-3-(2,5-dimethylpyry-1-yl)phenyl)titanium.

Of the compounds bis(cyclopentadienyl)-bis(2,6-difluoro-3-(pyry-1-yl)phenyl)titanium is more preferred.

Commercially available titanocene photo radical initiators as component (1) may be used, including IRGACURE 727L (from by Ciba Specialty Chemicals Co., Ltd.) as bis(methylcyclopentadienyl)-Ti-bis-2,6-difluorophenyl and IRGACURE 784 (from Ciba Specialty Chemicals) as bis(cyclopentadienyl)-bis(2,6-difluoro-3-(pyry-1-yl)phenyl)titanium.

Of the titanocene photo radical initiators as component (1) described those generating a radical on being irradiated with light having wavelengths longer than 400 nm (1') are preferred because the sealant cures with visible light which causes less damage to the liquid crystal composition and exhibits excellent curing properties in a light shielded portion.

<Photocuring Resin (2)>

The photocuring resin (2) that can be used in the invention has a radical polymerizable functional group and polymerizes to cure on irradiation with light such as UV light. The term "radical polymerizable functional group" means a functional group at which polymerization occurs on irradiation with active energy rays such as UV light and includes (meth)acryl and allyl. Examples of photocuring resins having a radical polymerizable functional group include (meth)acrylates and unsaturated polyester resins. These resins may be used either individually or as a combination of two or more thereof. Suitable are (meth)acrylates, particularly monomers and/or oligomers having more than one (meth)acryl groups per molecule (2') in terms of rapid reaction progress and good adhesion.

Examples of the (meth)acrylates include, but are not limited to, urethane(meth)acrylates having a urethane bond and epoxy(meth)acrylates derived from a compound having a glycidyl group and (meth)acrylic acid.

Examples of the urethane (meth)acrylates include, but are not limited to, derivatives obtained from a diisocyanate (e.g., isophorone diisocyanate) and a compound addition-reactive with the isocyanate (e.g., acrylic acid or hydroxyethyl acrylate). The derivatives may have their chain extended with, e.g., a caprolactone or a polyol. Commercially available urethane (meth)acrylates may be used, including U-122P, U-3, 40P, U-4HA, U-1084A (all from Shin-Nakamura Chemical Co., Ltd.); and KRM7595, KRM7610, and KRM7619 (all from Daicel-UCB Co., Ltd.).

The epoxy(meth)acrylates are exemplified by, but not limited to, those derived from an epoxy resin (e.g., bisphenol A epoxy resin or propylene glycol diglycidyl ether) and (meth)acrylic acid. Commercially available epoxy(meth)acrylates may be used, including EA-1020, EA-6320, and EA-5520 (all from Shin-Nakamura Chemical); and Epoxy Ester 70PA and Epoxy Ester 3002A (both from Kyoeisha Chemical Co., Ltd.).

Examples of other (meth)acrylates include methyl methacrylate, tetrahydrofurfuryl methacrylate, benzyl methacrylate, isobornyl methacrylate, 2-hydroxyethyl methacrylate, glycidyl methacrylate, (poly)ethylene glycol dimethacrylate, 1,4-butanediol dimethacrylate, 1,6-hexanediol dimethacrylate, trimethylolpropane triacrylate, pentaerythritol triacrylate, and glycerol dimethacrylate.

The photocuring resin having thermosetting properties is preferably an epoxy/(meth)acrylic resin having at least one (meth)acryl group and at least one epoxy group per molecule. The epoxy/(meth)acrylic resin exhibits thermal curability as well as photocurability because of its photocuring functional group (i.e., (meth)acryl group) and a thermosetting functional group (i.e., epoxy group).

Examples of such an epoxy/(meth)acrylic resin include a compound obtained by causing some of the epoxy groups of the above described epoxy resin to react with (meth)acrylic acid in the presence of a basic catalyst in a usual manner; a compound obtained by causing one mole of a bifunctional or polyfunctional isocyanate to react with ½ moles of a (meth) acrylic monomer having a hydroxyl group and then with ½ moles of glycidol; and a compound obtained by the reaction between a (meth)acrylate having an isocyanate group and glycidol. Commercially available epoxy/(meth)acrylic resins may be used, such as UVAC1561 from Daicel-UBC.

Preferred of the photocuring resins as component (2) described above are those containing an acrylate-modified, bi- or polyfunctional glycidyl ether resin, particularly an acrylate-modified, bisphenol A glycidyl ether resin, because of reduced elutability from the sealant into liquid crystals, namely, low contamination to liquid crystals. The ratio of the acrylate-modified bi- or polyfunctional glycidyl ether resin in the photocuring resin (2) is preferably 60 to 100 parts by weight per 100 parts by weight of the photocuring resin (2). When the ratio is less than 60 parts by weight, elution into liquid crystals would be considerable to cause alignment disturbance.

In order to suppress elution into liquid crystals and to improve adhesive strength, the amount of the photocuring resin (2) is preferably 30 to 80 parts, more preferably 40 to 70 parts, by weight per 100 parts by weight of the total curing resin (i.e., photocuring resin+thermosetting resin) in the sealant for ODF. When the amount is less than 30 parts, the resin can be eluted into liquid crystals. When the amount is more than 80 parts, the adhesive strength reduces.

In the cases when the photocuring resin (2) is a thermosetting, photocuring resin, such as the epoxy/(meth)acrylic resin, it is preferred that the weight ratio of the photocuring functional group (e.g., (meth)acryl)) and the thermosetting functional group (e.g., epoxy) be controlled in accordance with the above recited ratio of the photocuring resin to the total curing resin.

<Latent Epoxy Curing Agent (3)>

The latent epoxy curing agent (3) is preferably a curing agent comprising a reaction product obtained by the reaction between a polyamine having at least one active hydrogen atom and at least two nitrogen atoms per molecule and an acidic compound (3') in view of low contamination to liquid crystals, adhesive strength, and storage stability. Examples of the polyamine having at least one active hydrogen atom and at least two nitrogen atoms per molecule include, but are not limited to, ethylenediamine, propylenediamine, butylenediamine, hexamethylenediamine, diethylenetriamine, dipropylenetriamine, dibutylenetriamine, triethylenetetramine, tripropylenetetramine, tributylenetetramine, tetraethylenepentamine, tetrapropylenepentamine, tetrabutylenepentamine, N,N'-dimethylethylenediamine, pentaethylenehexamine, isophoronediamine, menthanediamine, phenylenediamine, 4-aminodiphenylamine, o-xylylenediamine, m-xylylenediamine, p-xylylenediamine, 3,5-diaminochlorobenzene, melamine, piperazine, 1-aminoethylpiperazine, monomethylaminopropylamine, methyliminobispropylamine, 1,3-bis(aminomethyl)cyclohexane, aminophenyl ether, polyethyleneimine, polypropyleneimine, poly-3-methylpropylimine, poly-2-ethylpropylimine, polyvinylamine, polyallylamine, and copolymers obtained from an unsaturated amine (e.g., vinylamine or allylamine) and copolymerizable monomers having an unsaturated bond (e.g., dimethylacrylamide, styrene, methyl acrylate, methyl methacrylate, acrylic acid, methacrylic acid, styrenesulfonic acid, or a salt thereof). Preferred of these polyamines are propylenediamine, isophoronediamine, menthanediamine, and 1,3-bis(aminomethyl)cyclohexane.

Compounds obtained by adding an epoxy compound to the polyamine listed above are also preferred as the polyamine having at least one active hydrogen atom and at least two nitrogen atoms per molecule.

Suitable compounds as the epoxy compound include alicyclic epoxy compounds, aromatic epoxy compounds, and aliphatic epoxy compounds. These epoxy compounds may be used either alone or as a mixture of two or more thereof.

Examples of the alicyclic epoxy compounds are polyglycidyl ethers of polyhydric alcohols having at least one alicyclic ring and cyclohexene oxide- or cyclopentene oxide-containing compounds obtained by epoxidizing cyclohexene ring- or cyclopentene ring-containing compounds with an oxidizing agent. Specific examples thereof include hydrogenated bisphenol A diglycidyl ether, 3,4-epoxycyclohexylmethyl 3,4-epoxycyclohexanecarboxylate, 3,4-epoxy-1-methylcyclohexyl 3,4-epoxy-1-methylcyclohexanecarboxylate, 6-methyl-3,4-epoxycyclohexylmethyl 6-methyl-3,4-epoxycyclohexanecarboxylate, 3,4-epoxy-3-methylcyclohexylmethyl 3,4-epoxy-3-methylcyclohexanecarboxylate, 3,4-epoxy-5-methylcylcohexylmethyl 3,4-epoxy-5-methylcyclohexanecarboxylate, 2-(3,4-epoxycyclohexyl-5,5-spiro-3,4-epoxy)cyclohexane-metadioxane, bis(3,4-epoxycyclohexylmethyl)adipate, 3,4-epoxy-6-methylcyclohexyl carboxylate, methylenebis(3,4-epoxycyclohexane), dicyclopentadiene diepoxide, ethylenebis(3,4-epoxycyclohexane carboxylate), dioctyl epoxyhexahydrophthalate, and di-2-ethylhexyl epoxyhexahydrophthalate.

Commercially available products that are suitably used as the alicyclic epoxy compound include UVR-6100, UVR-6105, UVR-6110, UVR-6128, and UVR-6200 (all from Union Carbide); Celloxide 2021, Celloxide 2021P, Celloxide 2081, Celloxide 2083, Celloxide 2085, Celloxide 2000, Celloxide 3000, Cyclomer A200, Cyclomer M100, Cyclomer M101, Epolead GT-301, Epolead GT-302, Epolead 401, Epolead 403, ETHB, and Epolead HD300 (all from Daicel Chemical Industries, Ltd.); and KRM-2110 and KRM-2199 (both from ADEKA Corp.).

Preferred of the alicyclic epoxy compounds described above are epoxy resins having a cyclohexene oxide structure in terms of curing properties (cure rate).

Examples of the aromatic epoxy compounds include polyglycidyl ethers of polyhydric phenols or alkylene oxide adducts thereof having at least one aromatic ring, such as glycidyl ethers of bisphenol A, bisphenol F, or an alkylene oxide adduct thereof, and epoxy novolak resins.

Examples of the aliphatic epoxy compounds include polyglycidyl ethers of aliphatic polyhydric alcohols or alkylene oxide adducts thereof, polyglycidyl esters of aliphatic long-chain polybasic acids, homopolymers obtained by vinyl polymerization of glycidyl acrylate or glycidyl methacrylate, and copolymers obtained by vinyl polymerization of glycidyl acrylate or glycidyl methacrylate and other vinyl monomer(s). Typical examples are polyhydric alcohol glycidyl ethers, such as 1,4-butanediol diglycidyl ether, 1,6-hexanediol diglycidyl ether, glycerol triglycidyl ether, trimethylolpropane triglycidyl ether, sorbitol tetraglycidyl ether, dipentaerythritol hexaglycidyl ether, polyethylene glycol diglycidyl ether, and polypropylene glycol diglycidyl ether; polyglycidyl ethers of polyether polyols obtained by adding one or more kinds of alkylene oxides to aliphatic polyhydric alcohols, such as propylene glycol, trimethylolpropane, and glycerol; and diglycidyl esters of aliphatic long-chain dibasic acids. Further included are monoglycidyl ethers of aliphatic higher alcohols, monoglycidyl ethers of phenol, cresol, butylphenol, or polyether alcohols obtained by adding an alkylene oxide thereto, glycidyl esters of higher fatty acids, epoxidized soybean oil, octyl epoxystearate, butyl epoxystearate, and epoxidized polybutadiene.

Commercially available products suitably used as the aromatic or aliphatic epoxy compound include Epikote 801 and Epikote 828 (both from Yuka Shell Epoxy Co., Ltd.); PY-306, 0163, and DY-022 (all from Ciba Specialty Chemicals); KRM-2720, EP-3300, EP-4000, EP-4010, EP-4080, EP-4088, EP-4100, EP-4900, EP-4901, EP-4030, ED-505, and ED-506 (all from ADEKA); Epolite M-1230, Epolite EHDG-L, Epolite 40E, Epolite 100E, Epolite 200E, Epolite 400E, Epolite 70P, Epolite 200P, Epolite 400P, Epolite 1500NP, Epolite 1600, Epolite 80MF, Epolite 100MF, Epolite FR-1500, Epolite 3002, and Epolite 4000 (all from Kyoeisha Chemical); Santoto ST0000, YD-716, YH-300, PG-202, PG-207, YD-172, and YDPN638 (all from Tohto Kasei Co., Ltd.); TEPIC-S (from Nissan Chemical Industries, Ltd.); and Epichlon N-665, Epichlon N-740, Epichlon HP-7200, and Epichlon HP-4032 (all from DIC Corp.).

Examples of the acidic compound include phenol resins, polyhydric phenol compounds, and polycarboxylic acids. The phenol resins are synthesized from phenols and aldehydes and include phenol/formalin resins, cresol/formalin resins, bisphenol A (BPA)/formalin resins, bisphenol F (BPF)/formalin resins, alkylphenol/formalin resins, and mixtures thereof. Phenol or cresol novolak resins are particularly preferred. Examples of the polyhydric phenol compounds are bisphenol A, bisphenol F, and resorcinol. Examples of the polycarboxylic acids include dicarboxylic acids, such as adipic acid, sebacic acid, dodecane di-acid, and azelaic acid.

Carboxyl-terminated ester compounds, which are COOH-terminated adducts of an acid anhydride and a polyol, are also useful. Examples of such compounds are a phthalic anhydride/ethylene glycol 2:1 adduct and a tetrahydrophthalic anhydride/propylene glycol 2:1 adduct.

When a phenol resin or a polyhydric phenol compound is used as the acidic compound, the phenol resin or polyhydric phenol compound is preferably used in an amount of 0.20 to 3.0 molar equivalents, more preferably 0.3 to 1.2 molar equivalents, per mole of the epoxy compound/amine adduct. When that amount is less than 0.20 molar equivalents, the sealant has very poor storage stability. When that amount is more than 3.0 molar equivalents, compatibility, curability, and physical properties are reduced.

When a polycarboxylic acid is used as the acidic compound, it is preferably used in an amount of 0.01 to 2.0 mol, more preferably 0.05 to 1.0 mol, per mole of the epoxy compound/amine adduct. When the amount of the polycarboxylic acid exceeds 2.0 mol, the sealant will have poor curability and markedly reduced physical properties.

When a phenol resin or a polyhydric phenol compound and a polycarboxylic acid are used in combination as the acidic compound, the phenol resin or polyhydric phenol compound is preferably used in an amount of 0.3 to 1.2 mol per mole of the epoxy compound/amine adduct, and the polycarboxylic acid is preferably used in an amount of 0.05 to 1.0 mol per mole of the epoxy compound/amine adduct.

Also included in the scope of the invention are an embodiment in which the latent epoxy curing agent is the reaction product obtained by the reaction between the epoxy compound/amine adduct and a combination of the phenol resin, the polyhydric phenol, and the polycarboxylic acid and an embodiment in which the curing agent is a mixture of the reaction product between the epoxy compound/amine adduct and the phenol resin, the reaction product between the epoxy compound/amine adduct and the polyhydric phenol, and the reaction product between the epoxy compound/amine adduct and the polycarboxylic acid.

The reaction between the epoxy compound/amine adduct and the acidic compound is carried out at 80 to 200° C. for 30 minutes to 5 hours.

Conventional latent epoxy curing agents, such as an acid anhydride, dicyandiamide, melamine, hydrazide, an imidazole compound, an alkylurea, and a guanamine compound, may be used as the latent epoxy curing agent (3) in place of or in combination with the above described curing agent (3').

Of the latent epoxy curing agents described as component (3) those having a melting temperature of 50 to 110° C. are preferred for process simplification, and those having a melting temperature of 60 to 80° C. are more preferred. Those having a melting temperature lower than 40° C. are unstable, easily inducing the curing resin to cure during sealant preparation. Those having a melting temperature higher than 120° C. need a long thermosetting time and, if the heating temperature is elevated in an attempt to shorten the time, the liquid crystal composition would be damaged greatly.

The latent epoxy curing agent (3) is preferably used in an amount of 0.3 to 150 parts, more preferably 20 to 100 parts, by weight per 100 parts by weight of the epoxy compound (resin).

<Monomer with at Least Two Glycidyl Ether Groups Per Molecule (4)>

Where necessary, the sealant for ODF of the invention contains a monomer with at least two glycidyl ether groups per molecule (4) as a thermosetting resin in addition to the titanocene photo radical initiator (1), the photocuring resin (2), and the latent epoxy curing agent (3).

In the cases where the photocuring resin (2) is the thermosetting photocuring resin, such as epoxy/(meth)acrylic resin, component (4) may or may not be used.

Examples of the monomers having at least two glycidyl ether groups per molecule as component (4) include the epoxy resins described above as examples of the epoxy compound. The epoxy resin as a thermosetting resin may be the same or different from the epoxy resin used in the latent epoxy curing agent (3). Particularly suitable for use as a thermosetting resin are a bisphenol A epoxy resin, a bisphenol F epoxy resin, a hydrogenated bisphenol A epoxy resin, a bisphenol A-propylene oxide modified epoxy resin, a phenol novolak epoxy resin, a cresol novolak epoxy resin, a naphthalene epoxy resin, and an NBR modified epoxy resin.

Of the described monomers having at least two glycidyl ether groups per molecule as component (4), a mixed monomer containing a bisphenol A-propylene oxide modified epoxy compound is preferred to afford improved compatibility. The proportion of the bisphenol A-propylene oxide modified epoxy compound in the described monomers having at least two glycidyl ether groups per molecule (4) is preferably 20 to 70 parts by weight per 100 parts by weight of the total of the monomers having at least two glycidyl ether groups per molecule (4). When the proportion is less than 20 parts by weight, the sealant has reduced adhesion. When the proportion exceeds 70 parts by weight, the resin can be eluted into liquid crystals.

As described, the sealant for ODF of the invention contains the titanocene photo radical initiator (1), the photocuring resin (2), the latent epoxy curing agent (3), and, if necessary, the monomer having at least two glycidyl ether groups per molecule (4). Preferred contents of components (1) to (4) in the sealant are: 0.1 to 4%, more preferably 0.3 to 2%, of the titanocene photo radical initiator (1); 10 to 80%, more preferably 20 to 70%, of the photocuring resin (2); 2 to 30%, more preferably 5 to 25%, of the latent epoxy curing agent (3); and 5 to 50%, more preferably 10 to 35%, of the monomer having at least two glycidyl ether groups per molecule (4); all by weight.

In the cases when the monomer having at least two glycidyl ether groups per molecule (4) is not used, the photocuring resin (2) must be a thermosetting photocuring resin. In such cases, the contents of components (1) to (3) in the sealant are: 0.1 to 4%, more preferably 0.3 to 2%, of the titanocene photo radical initiator (1); 45 to 85%, more preferably 50 to 70%, of the photocuring resin (2); and 2 to 30%, more preferably 5 to 25%, of the latent epoxy curing agent (3); all by weight.

<Filler (5)>

If desired, the sealant for ODF of the invention may contain a filler (5). Examples of the filler include fused silica, crystalline silica, silicon carbide, silicon nitride, boron nitride, calcium carbonate, magnesium carbonate, barium sulfate, calcium sulfate, mica, talc, clay, activated carbon, core/shell rubber, block copolymers, a glass filler, alumina, titania, magnesium oxide, zirconium oxide, aluminum hydroxide, magnesium hydroxide, calcium silicate, aluminum silicate, lithium aluminum silicate, zirconium silicate, barium titanate, glass fiber, carbon fiber, molybdenum disulfide, silica stone powder, bitumen, cellulose, clay, mica, aluminum powder, Aerosil, and bentonite. Preferred among them are fused silica, crystalline silica, silicon nitride, boron nitride, calcium carbonate, barium sulfate, calcium sulfate, mica, talc, clay, alumina, aluminum hydroxide, calcium silicate, and aluminum silicate. More preferred are fused silica, crystalline silica, alumina, and talc. These fillers may be used as a mixture of two or more thereof.

The filler (5) may be used in an amount of about 10 to 50% by weight, preferably about 20 to 40% by weight, based on the sealant of the invention.

<Silane Coupling Agent (6)>

It is preferred that the sealant of the invention further contain a silane coupling agent (6) to have improved adhesive strength and thereby enhanced reliability against moisture. Examples of suitable silane coupling agents include 3-glycidoxypropyltrimethoxysilane, 3-glycidoxypropylmethyldimethoxysilane, 3-glycidoxypropylmethyldimethoxysilane, 2-(3,4-epoxycyclohexyl)ethyltrimethoxysilane, N-phenyl-γ-aminopropyltrimethoxysilane, N-(2-aminoethyl)-3-aminopropylmethyldimethoxysilane, N-(2-aminoethyl)-3-aminopropylmethyltrimethoxysilane, 3-aminopropyltriethoxysilane, 3-mercaptopropyltrimethoxysilane, vinyltrimethoxysilane, N-(2-(vinylbenzylamino)ethyl)-3-aminopropyltrimethoxysilane hydrochloride, 3-methacryloxypropyltrimethoxysilane, 3-chloropropylmethyldimethoxysilane, and 3-chloropropyltrimethoxysilane. These silane coupling agents may be used as a mixture of two or more thereof.

The silane coupling agent (6) may be used in an amount of about 0.1 to 4% by weight, preferably about 0.5 to 3% by weight, based on the sealant of the invention.

<Other Additives>

If desired, the sealant for ODF of the invention may further contain other additives, including organic solvents, pigments, leveling agents, defoaming agents, conductive materials, and the like. The sealant of the invention may furthermore contain diluents, flame retardants, and others according to necessity.

The total amount of the above mentioned additives is preferably not more than 10% by weight relative to the sealant.

The sealant for ODF according to the invention is prepared by, for example, mixing and dissolving predetermined amounts of the photocure-related components (i.e., the titanocene photo radical initiator (1) and the photocuring resin (2)), the thermal cure-related components (i.e., the latent epoxy curing agent (3) and the monomer having at least two glycidyl ether groups per molecule (4)), and, if desired, various additives and uniformly kneading the mixture using a known mixing device, e.g., a three-roll mill, a sand mill, or a ball mill.

The sealant for ODF of the invention can be used to seal any liquid crystal composition containing any compounds. It is suitably used to seal a polymerizable liquid crystal composition containing a liquid crystal compound and/or a polymerizable compound each having a polymerizable functional group, particularly a polymerizable liquid crystal composition containing a liquid crystal compound and/or a polymerizable compound each having a carbon-carbon unsaturated double bond. Examples of such a liquid crystal compound and/or a polymerizable compound each having a carbon-carbon unsaturated double bond include liquid crystal compound and/or a polymerizable compound each having alkenyl, styryl, allyl, vinyloxy, (meth)acryl, or maleimide bonded thereto either conjugatedly or nonconjugatedly.

The LCD of the invention will then be described. The LCD of the invention is manufactured by using the aforementioned sealant for an ODF process. The LCD of the invention includes a pair of substrates having a prescribed electrode formed thereon and disposed face to face with a prescribed gap therebetween, a sealant sealing the substrates along their periphery, and liquid crystals sealed in the gap. While the liquid crystals to be sealed are not particularly limited, the effects of the invention are remarkable on polymerizable liquid crystal compositions. Materials of the two substrates are not particularly limited and chosen from glass, quartz, plastics, silicon, and so on provided that at least one of them should be light transmissive.

The LCD of the invention is produced, for example, as follows. The sealant of the invention having a spacer added thereto is applied to one of the substrates by means of, e.g., a dispenser. Liquid crystal is dropped on the area surrounded by the applied, uncured sealant. The other substrate is joined thereto in vacuo to result in a predetermined cell gap. The sealed portion is irradiated using a UV irradiating device to photocure (temporarily cure). The UV irradiation dose is preferably 500 to 6000 mJ/cm$^2$, more preferably 1000 to 4000 mJ/cm$^2$.

The sealed portion is then treated at 90 to 130° C. for 0.5 to 2 hours to cure completely. The resulting LCD is free from display defects ascribable to liquid crystal contamination and superior in adhesion and reliability against moisture.

Examples of the spacer include glass fiber, silica beads, and polymer beads. The diameter of the spacer is usually 2 to 8 μm, preferably 4 to 7 μm, while varying according to the purpose. The amount of the spacer is usually about 0.1 to 4 parts, preferably about 0.5 to 2 parts, more preferably about 0.9 to 1.5 parts, by weight per 100 parts by weight of the sealant for ODF.

The photosensitive resin composition according to the invention contains a titanocene photo radical initiator that generates a radical on exposure to light having wavelengths longer than 400 nm (1'), a monomer and/or an oligomer each having at least two (meth)acryl groups per molecule (2'), a reaction product obtained by the reaction between a polyamine having at least one active hydrogen atom and at least two nitrogen atoms per molecule and an acidic compound (3'), and a monomer having at least two glycidyl ether groups per molecule. (4)

The photosensitive resin composition of the invention preferably contains 0.1 to 4%, more preferably 0.3 to 2%, of component (1'), 1 to 99.5%, more preferably 5 to 90%, of component (2'), 0.5 to 40%, more preferably 1 to 30%, of component (3'), and 1 to 99%, more preferably 5 to 90%, of component (4), all by weight.

The description given to the corresponding components of the sealant for ODF according to the invention applies appropriately to components (1'), (2'), (3'), and (4).

The photosensitive resin composition of the invention is useful as ink, protective films, varnishes, coating, insulators, structural materials, optical discs, sealants, and stereolithographic materials.

EXAMPLES

The present invention will now be illustrated in greater detail with reference to Examples, but it should be understood that the invention is not deemed to be limited thereto.

Preparation Example 1 shows the preparation of a photocuring resin as component (2). Preparation Example 2 shows the preparation of a latent epoxy curing agent as component (3). Evaluation Example 1 and Comparative Evaluation Examples 1 to 3 present evaluations of contamination of a polymerizable liquid crystal composition with photo radical initiators. Examples 1 to 3 and Comparative Examples 1 to 5 show the preparation and evaluation of sealants for ODF of the invention and those for comparison.

Preparation Example 1

Preparation of Bisphenol A Epoxy Acrylate Modified Resin No. 1

In a reaction flask were put and stirred 90 g of a bisphenol A epoxy resin EP4100 (from ADEKA; epoxy-value: 185 g/eq) and 133 g of toluene. To the mixture were added 1 g of triethylamine, 0.55 g of methoxyphenol, and 51.7 g of acrylic acid, followed by heating up to 95° C., at which temperature the reaction system was stirred for 22 hours. The reaction was continued until the epoxy-value reduced to 1% or less of the initial value. After the reaction mixture was cooled to 70° C., 400 g of toluene was added. The mixture was washed once with 250 g of water and three times with 250 g of a 0.1 N aqueous sodium hydroxide solution. The product was further washed with pure water until the electric conductivity of the washing was decreased to 1 μS/cm. The solvent was removed in an evaporator at 60° C. to give 125.1 g (94.1%) of bisphenol A epoxy acrylate modified resin No. 1 having a viscosity of 911 Pa·s (2.5° C.) and an acid value of 0 mg KOH/g.

Preparation Example 2

Preparation of Latent Epoxy Curing Agent No. 1

To 140 g of 1,3-bisaminocyclohexane in a reaction flask was added 250 g of BPA glycidyl ether (Adekaresin EP4100 from ADEKA) at 100° C. The temperature was raised to 140° C., at which addition reaction was conducted for 2 hours to obtain polyamine No. 1. To 25 g of polyamine No. 1 was added 3 g of a phenol novolak resin having a melting temperature of 100° C., followed by melt masking reaction at 150° C. for 60 minutes to obtain latent epoxy curing agent No. 1. The resulting compound was ground in a jet mill to particles of 5 μm or smaller. The melting temperature of the compound was 78° C.

Evaluation Example 1

Elution of Photo Radical Initiator into Polymerizable Liquid Crystal Composition To 1 g of the polymerizable liquid crystal composition consisting of the compounds shown below was added 40 mg of a titanocene photo radical initiator IRGACURE 784 (from Ciba Specialty Chemicals), followed by heating until the liquid crystal phase disappeared. The supernatant liquor was separated. Contamination of liquid crystals in the separated polymerizable liquid crystal composition was evaluated by determining the reduction of liquid crystal compound No. 1 and voltage holding ratio (VHR) as follows. The results obtained are shown in [Table 1].

Evaluation on Reduction of Liquid Crystal Compound No. 1:
The polymerizable liquid crystal composition obtained above was diluted with acetone and analyzed by gas chromatography using the internal standard method (OV-171m packed column) to determine a percent reduction of liquid crystal compound No. 1.

Evaluation on VHR:
The polymerizable liquid crystal composition obtained above was injected into an open-type test cell for evaluation (cell gap: 5 μm; electrode area: 1 cm$^2$; alignment film: SE-7492). After irradiation with 100 mJ/cm$^2$ light for 300 seconds using an ultrahigh pressure mercury lamp 30J, the VHR was determined using VHR-1A from Toyo Corp. The measurement conditions were: pulse voltage width of 60 μs, frame period of 16.7 ms, amplitude of ±5 V, and a measuring temperature of 25° C.

Comparative Evaluation Examples 1 to 3

Contamination of liquid crystal in a polymerizable liquid crystal composition was evaluated in the same manner as in Evaluation Example 1, except for replacing the photo radical initiator IRGACURE 784 with the photo radical initiator shown in Table 1 below. The results of evaluation are shown in Table 1.

[Chem. 1]

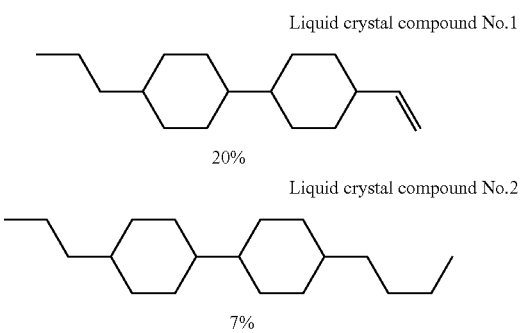

-continued

Liquid crystal compound No.3
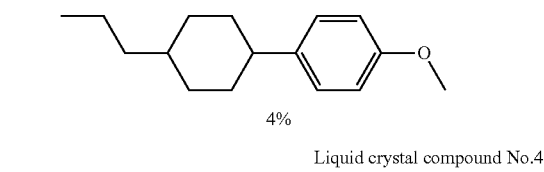
4%

Liquid crystal compound No.4
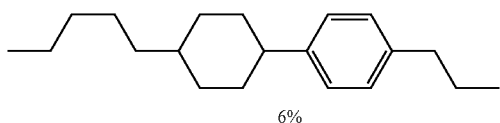
6%

Liquid crystal compound No.5
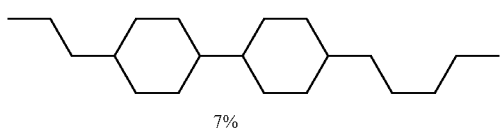
7%

Liquid crystal compound No.6
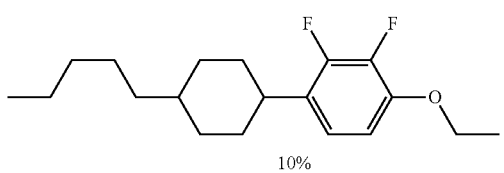
10%

Liquid crystal compound No.7
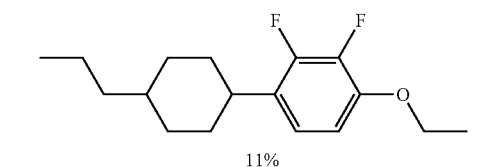
11%

Liquid crystal compound No.8
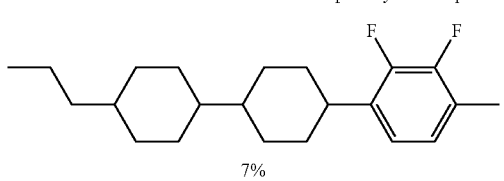
7%

Liquid crystal compound No.9
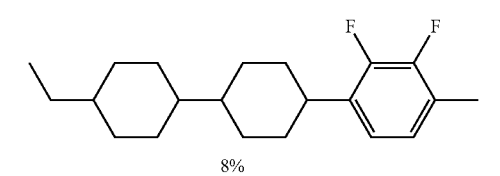
8%

Liquid crystal compound No.10
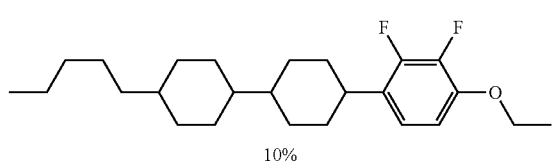
10%

Liquid crystal compound No.11
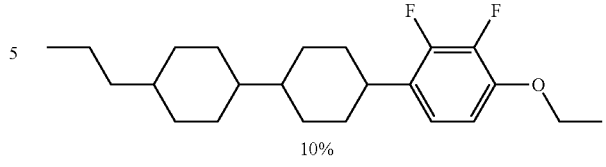
10%

TABLE 1

| | Evaluation Example 1 | Compar. Evaluation Example 1 | Compar. Evaluation Example 2 | Compar. Evaluation Example 3 |
|---|---|---|---|---|
| Photo Radical Initiator | Irg784 | Irg819*1 | OXE-01*2 | Irg2959*3 |
| Reduction of Compound No. 1 (%) | 1.6 | 4.9 | 9.2 | 5.1 |
| VHR (%) | 98.5 | 95.2 | 94.7 | 95.4 |

*1 Irg819 (IRGACURE 819, from Ciba Specialty Chemicals): non-titanocene photo radical initiator
*2 OXE-01 (IRGACURE OXE-01, from Ciba Specialty Chemicals): non-titanocene photo radical initiator
*3 Irg2959 (IRGACURE 2959, from Ciba Specialty Chemicals): non-titanocene photo radical initiator It is seen from Table 1 that the titanocene photo radical initiator is less elutable into liquid crystals and therefore less affecting the liquid crystals as demonstrated in Evaluation Example 1. On the other hand, non-titanocene photo radical initiators are eluted into liquid crystals to cause the polymerizable liquid crystal compound (i.e., liquid crystal compound No. 1) to photoreact, resulting in a reduction of liquid crystal compound No. 1 in the liquid crystal composition. The elution of the initiator also reduces the VHR of the liquid crystal composition as proved in Comparative Evaluation Examples 1 to 3.

Examples 1 to 3 and Comparative Examples 1 to 5

Materials described below were compounded according to the formulations of Tables 2 and 3. Each of the mixtures was dispersed and kneaded in a three-roll mill and degassed in a planetary stirring and defoaming apparatus to obtain sealants of Examples 1 to 3 and Comparative Examples 1 to 5. The compounding ratio of the epoxy resin and the curing agent were decided in conformity to the molar ratio of the reactive groups in the corresponding starting materials. The resulting sealants were evaluated in terms of curing properties (reaction ratio) and voltage holding ratio (VHR) of test cells made by using the sealants, elution of the photo radical initiator, and adhesive strength. The results obtained are shown in Tables 2 and 3.

(1-1) IRGACURE 784 (from Ciba Specialty Chemicals)
(1-2) IRGACURE OXE-01 (from Ciba Specialty Chemicals)
(1-3) IRGACURE 819 (from Ciba Specialty Chemicals)
(1-4) IRGACURE 907 (from Ciba Specialty Chemicals)
(2) Resin No. 1 obtained in Preparation Example 1
(3-1) Curing agent No. 1 obtain in Preparation Example 2
(3-2) Amicure VDH (hydrazide curing agent, from Ajinomoto Fine-Techno Co., Inc.)
(4-1) Thermosetting resin EP-4000 (bisphenol A-propylene oxide modified glycidyl ether epoxy resin, from ADEKA)
(4-2) Thermosetting resin EP-4100 (bisphenol A-glycidyl ether epoxy resin, from ADEKA)

(5) Silica gel SE-2500 (average particle size: 0.5 μm, from Admatechs Co., Ltd.)
(6) Silane coupling agent Z-6040N (from Dow Corning Toray Co., Ltd.)

Evaluation on VHR:

Each sealant having 4 μm beads dispersed therein in a concentration of 1 wt % as a spacer was applied to an electroded substrate having an alignment film (JALS2096) in a 4 cm square pattern by means of a dispenser. A small amount of the liquid crystal composition prepared in Evaluation Example 1 was dropped on the area surrounded by the square. Another substrate was joined thereto in vacuo. The cell was irradiated with 3000 mJ/cm$^2$ UV light from which wavelengths of 400 nm or shorter had been cut off under atmospheric pressure and then heat treated at 120° C. for 1 hour for cure. The VHR of the resulting cell was determined using VHR-1A from Toyo Corp. The measurement conditions were: pulse voltage width of 60 μs, frame period of 16.7 ms, amplitude of ±5 V, and a measuring temperature of 25° C.

Evaluation of Elution of Initiator:

Four grams of the polymerizable liquid crystal composition prepared in Evaluation Example 1 and 1 g of each sealant obtained in Examples 1 to 3 and Comparative Examples 1 to 4 were put in a 10 ml-volume brown vial and allowed to stand at 25° C. for 6 hours. The supernatant liquor was separated and analyzed by liquid chromatography (column: ODS column; solvent: acetonitrile; detection: 254 nm) to examine the presence of the photo radical initiator having been eluted into the polymerizable liquid crystal composition. The sealant was rated "good" when the initiator was not detected while it was rated "poor" when the initiator was detected.

TABLE 2

|  | Example | | | Comparative Example | | | |
| --- | --- | --- | --- | --- | --- | --- | --- |
|  | 1 | 2 | 3 | 1 | 2 | 3 | 4 |
| Composition (part by weight) | | | | | | | |
| (1-1) | 1 | 1 | 0.5 | — | — | — | — |
| (1-2) | — | — | — | 1 | 1 | — | — |
| (1-3) | — | — | — | — | — | 1 | — |
| (1-4) | — | — | — | — | — | — | 0.5 |
| (2) | 26 | 27 | 44 | 27 | 26 | 26 | 44 |
| (3-1) | 15 | — | 7 | — | 15 | 15 | 7 |
| (3-2) | — | 12 | — | 12 | — | — | — |
| (4-1) | 20 | 9 | 11.5 | 9 | 20 | 20 | 11.5 |
| (4-2) | 7 | 19 | — | 19 | 7 | 7 | — |
| (5) | 30 | 30 | 35 | 30 | 30 | 30 | 35 |
| (6) | 2 | 2 | 2 | 2 | 2 | 2 | 2 |
| VHR (%) | 99.5 | 99.4 | 99.4 | 99.5 | 99.5 | 99.4 | 98.2 |
| Initiator Elution | good | good | good | poor | poor | poor | good |

As is apparent from Table 2, the sealants of Comparative Examples 1 to 3 allow the photo radical initiator to be eluted to contaminate the polymerizable liquid crystal composition. Although the photo radical initiator used in Comparative Example 4 is not eluted, it generates a lesser amount of radicals with light of wavelengths longer than 400 nm. As a result, the liquid crystal cell has a reduced voltage holding ratio, which leads to reduced reliability of an LCD. It is apparent from the results of Examples 1 to 3 that the sealants of the invention are little contaminating to the polymerizable liquid crystal composition.

Evaluation on Reaction Ratio (Curing Properties):

Each of the sealants obtained in Example 1 and Comparative Example 5 was applied to a 1.1 mm thick glass plate using a dispenser. Another glass plate was joined thereto to spread the sealant to a circle of about 3 mm in diameter to make a specimen. The specimen was irradiated with 3000 mJ/cm of UV light of an ultrahigh pressure mercury lamp from which wavelengths of 400 nm or shorter were cut off. The specimen was analyzed by FT-IR spectrometry before and after the irradiation. The reaction ratio was calculated from the peak areas assigned to the acryl group (1400 to 1410 cm$^{-1}$) and reference peak areas (1730 cm$^{-1}$).

Evaluation of Adhesive Strength:

Each of the sealants obtained in Example 1 and Comparative Example 5 was applied to the center of a 25 mm×50 mm×4 mm (t) glass plate using a dispenser. Another glass plate was joined thereto in a crosswise relation. The glass plates were irradiated with 3000 mJ/cm$^2$ UV light of an ultrahigh pressure mercury lamp from which wavelengths of 400 nm or shorter were cut off and then heated in an oven at 120° C. for 1 hour to make a specimen. The tensile strength of the specimen was determined using a universal tester from Shimadz Corp.

TABLE 3

| Composition (part by weight) | Example 1 | Comparative Example 5 |
| --- | --- | --- |
| (1-1) | 1 | — |
| (1-2) | — | — |
| (1-3) | — | — |
| (1-4) | — | 1 |
| (2) | 26 | 26 |
| (3-1) | 15 | 15 |
| (3-2) | — | — |
| (4-1) | 20 | 20 |
| (4-2) | 7 | 7 |
| (5) | 30 | 30 |
| (6) | 2 | 2 |
| Reaction Ratio (%) | 95 | 65 |
| Adhesive Strength (N/mm$^2$) | 21.8 | 14 |

As is apparent from Table 3, the sealant of Comparative Example 5, which contains a photo radical initiator that generates a lesser amount of radicals with light of wavelengths longer than 400 nm, has a low reaction ratio and a low adhesive strength. The results of Example 1 clearly prove that the sealant of the invention provides sufficient adhesive strength even with visible light that does not deteriorate the polymerizable liquid crystal composition.

As demonstrated above, the sealant for ODF of the invention containing a titanocene photo radical initiator that generates a radical with light of longer than 400 nm is suitable to the manufacture of polymer dispersed liquid crystal displays using a polymerizable liquid crystal composition.

The invention claimed is:

1. A sealant for a one drop fill process comprising a titanocene photo radical initiator (1), a photocuring resin (2), and a latent epoxy curing agent (3),
   wherein the photocuring resin (2) is a monomer and/or an oligomer each having at least two (meth)acryl groups per molecule.

2. The sealant for a one drop fill process according to claim 1, further comprising a monomer having at least two glycidyl ether groups per molecule (4).

3. The sealant for a one drop fill process according to claim 1, wherein the titanocene photo radical initiator (1) generates a radical upon exposure to light having wavelengths longer than 400 nm.

4. The sealant for a one drop fill process according to claim 1, wherein the latent epoxy curing agent (3) comprises a reaction product obtained by a reaction between a polyamine having at least one active hydrogen atom and at least two nitrogen atoms per molecule and an acidic compound.

5. The sealant for a one drop fill process according to claim 1, wherein the latent epoxy curing agent (3) has a melting temperature of 50 to 110° C.

6. The sealant for a one drop fill process according to claim 2, wherein the photocuring resin (2) is present in an amount of 30 to 80 parts by weight per 100 parts by weight of a sum of the photocuring resin (2) and the monomer having at least two glycidyl ether groups per molecule (4).

7. The sealant for a one drop fill process according to claim 1, comprising 0.1 to 4% of the titanocene photo radical initiator (1), 45 to 85% of the photocuring resin (2), and 2 to 30% of the latent epoxy curing agent (3), all by weight.

8. The sealant for a one drop fill process according to claim 2, comprising 0.1 to 4% of the titanocene photo radical initiator (1), 10 to 80% of the photocuring resin (2), 2 to 30% of the latent epoxy curing agent (3), and 5 to 50% of the monomer having at least two glycidyl ether groups per molecule (4), all by weight.

9. A liquid crystal display device comprising the sealant for a one drop fill process according to claim 1.

10. A photosensitive resin composition comprising a titanocene photo radical initiator that generates a radical on exposure to light having wavelengths longer than 400 nm (1'), a monomer and/or an oligomer each having at least two (meth)acryl groups per molecule (2'), a reaction product obtained by the reaction between a polyamine having at least one active hydrogen atom and at least two nitrogen atoms per molecule and an acidic compound (3'), and a monomer having at least two glycidyl ether groups per molecule (4').

11. The sealant for a one drop fill process according to claim 2, wherein the titanocene photo radical initiator (1) generates a radical upon exposure to light having wavelengths longer than 400 nm.

12. The sealant for a one drop fill process according to claim 2, wherein the latent epoxy curing agent (3) comprises a reaction product obtained by a reaction between a polyamine having at least one active hydrogen atom and at least two nitrogen atoms per molecule and an acidic compound.

13. The sealant for a one drop fill process according to claim 3, wherein the latent epoxy curing agent (3) comprises a reaction product obtained by a reaction between a polyamine having at least one active hydrogen atom and at least two nitrogen atoms per molecule and an acidic compound.

14. The sealant for a one drop fill process according to claim 2, wherein the latent epoxy curing agent (3) has a melting temperature of 50 to 110° C.

15. The sealant for a one drop fill process according to claim 3, wherein the latent epoxy curing agent (3) has a melting temperature of 50 to 110° C.

16. The sealant for a one drop fill process according to claim 4, wherein the latent epoxy curing agent (3) has a melting temperature of 50 to 110° C.

17. The sealant for a one drop fill process according to claim 2, wherein the photocuring resin (2) is a monomer and/or an oligomer each having at least two (meth)acryl groups per molecule.

* * * * *